(12) United States Patent
Sekine

(10) Patent No.: US 7,101,285 B2
(45) Date of Patent: Sep. 5, 2006

(54) CROSS-SHAPED JOINT

(75) Inventor: Hiroshi Sekine, Gunma-ken (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/477,702

(22) PCT Filed: Jan. 17, 2003

(86) PCT No.: PCT/JP03/00346

§ 371 (c)(1),
(2), (4) Date: Nov. 14, 2003

(87) PCT Pub. No.: WO03/064877

PCT Pub. Date: Aug. 7, 2003

(65) Prior Publication Data

US 2004/0152526 A1 Aug. 5, 2004

(30) Foreign Application Priority Data

Jan. 18, 2002 (JP) .............................. 2002-009600
Jun. 20, 2002 (JP) .............................. 2002-180299

(51) Int. Cl.
*F16D 3/41* (2006.01)
(52) U.S. Cl. ........................................ 464/14; 464/132
(58) Field of Classification Search ................ 464/11, 464/132, 136, 14; 384/568; 74/492
See application file for complete search history.

(56) References Cited

U.S. PATENT DOCUMENTS

| | | | |
|---|---|---|---|
| 2,078,739 A * | 4/1937 | Slaght | .................... 464/132 X |
| 2,470,071 A * | 5/1949 | Hilton | |
| 4,129,016 A | 12/1978 | Olson, Sr. | |
| 4,482,337 A | 11/1984 | Petrzelka | |
| 5,342,240 A | 8/1994 | Mazziotti | |
| 6,261,203 B1 | 7/2001 | Shimizuya et al. | |
| 6,334,714 B1 | 1/2002 | Harimoto et al. | |
| 2002/0077183 A1* | 6/2002 | Sekine | ........................ 464/11 |

FOREIGN PATENT DOCUMENTS

| | | |
|---|---|---|
| DE | 936 131 | 12/1955 |
| DE | 199 62 694 | 7/2000 |
| DE | 201 11 647 | 10/2001 |
| EP | 1 213 502 | 6/2002 |
| JP | 11-201150 | 7/1999 |
| JP | 2000-170786 | 6/2000 |
| JP | 2000-205362 | 7/2000 |

OTHER PUBLICATIONS

Universal Joint and Driveshaft Design Manual, AE-7, Society of Automotive Engineers, Inc., Warrendale, PA, pp. 62 & 66, TJ 1079.S62 1979.*

* cited by examiner

*Primary Examiner*—Greg Binda
(74) *Attorney, Agent, or Firm*—Miles & Stockbridge PC

(57) ABSTRACT

A cross-shaped joint is provided with a pair of yokes each of which is integrally provided with forked arms on which opposed circular holes are formed, a spider having four end shaft portions, and four bearings for rotatably supporting the end shaft portions of the spider respectively in the circular holes of the yokes. Each of the bearings includes a cup having a cylindrical portion fitted in the circular hole of the yoke and a plurality of rolling elements provided between the inner circumferential surface of the cup and the end shaft portion of the spider. The end shaft portions of the spider are interference fitted in the bearings via the rolling elements.

11 Claims, 7 Drawing Sheets

≤ 0.05 mm COAXIALITY w/ OPPOSITE SHAFT

CROSS-SHAPED JOINT

DESCRIPTION

1. Field of the Invention

The present invention relates to a cross-shaped joint to be used in a steering apparatus for a vehicle or the like. More particularly, the present invention relates to such a cross-shaped joint functioning as a universal joint that is composed of a pair of yokes and a cross-shaped spider.

2. Related Background Art

Generally, a steering apparatus for a vehicle has a cross-shaped joint provided between the upper shaft and the lower shaft of the steering shaft. The cross-shaped joint is composed of a pair of yokes and a cross-shaped spider and adapted to transmit a torque while rotating at a predetermined bending angle.

For example, Japanese Patent Application No. 2000-170786 discloses such a cross-shaped joint in which a spider shaft portion of a spider is rotatably fitted in a bearing hole of a yoke via a needle bearing including multiple roller type rolling elements, wherein a spherical projection formed at the center of the inner surface of a cup of the needle bearing is inserted and brought into pressure contact with a conical hole formed at the center of the spider shaft portion. With this structure, a small clearance between the spider shaft portion and the needle bearing is maintained uniformly even if a vibration is transmitted from the wheels, so that generation of abnormal noise due to interference of those members is prevented from occurring.

In the above-described conventional cross-shaped joint, however, in the case that the precision of the dimensions of parts is low, it is difficult, upon assembling the spider into the yoke, to bring the spherical projection on the inner surface of the needle bearing cup into contact with the conical hole of the spider shaft portion with an appropriate preload. Consequently, it is impossible to maintain the small clearance between the spider shaft portion and the needle bearing uniformly and there is a problem that abnormal noise is generated due to interference of those members.

On the other hand, if the precision of the dimensions of parts is enhanced, the generation of abnormal noise can be prevented, but there is a problem of an increase in the manufacturing cost.

In the case of so-called interference fit in which the spider shaft and the needle bearing are in contact through interference, generation of abnormal noise can be prevented. However, in this case, a bending torque sometimes increases. In addition, the roller type rolling elements, the cup and the spider shaft can be get scratched, if assembled by an ordinary assembly process. Therefore, upon assembling it is necessary to perform alignment of the spider shaft and the needle bearing with a high precision and to slow down the assembling speed depending on the circumstances. As a result, the assembling becomes time consuming and leads to an increase in the cost.

DISCLOSURE OF THE INVENTION

The present invention has been made in view of the above-described problems of conventional arrangements. An object of the present invention is to provide a cross-shaped joint that is easy to assemble without leading to a significant increase in the manufacturing cost and capable of preventing generation of abnormal noise due to interference of a spider shaft portion and needle bearing certainly and ensuring smooth steering feeling.

In order to attain the above object, according to the present invention there is provided a cross-shaped joint comprising:
a pair of yokes each of which is integrally provided with forked arms on which opposed circular holes are formed;
a spider having four end shaft portions; and
four bearings that rotatably support said end shaft portions of the spider respectively in the circular holes of the yokes, each of the bearings including a cup having a cylindrical portion fitted in the circular hole of the yoke and a plurality of roller type rolling elements provided between an inner circumferential surface of the cylindrical portion of the cup and said end shaft portion of the spider;
wherein said end shaft portions of the spider and said needle bearings are interference fitted via said rolling elements and each of said roller type rolling elements is shaped in such a way that its diameter gradually decreases from the vicinity of the central portion toward both end portions.

In the cross-shaped joint according to the present invention, said needle bearing and said spider shaft portion are in interference fit via said roller type rolling elements, and the spider shaft portion is interference fitted only in the vicinity of the central portion of the roller type rolling elements, in other words it is interference fitted only in the vicinity of the central portion of the needle bearing). Therefore, in the case that the cross-shaped joint according to the present invention is used in a steering apparatus for a vehicle, even if a vibration is transmitted from the wheels, each of the clearances between the spider shaft portion and the roller type rolling elements and between the inner surface of the cup and the roller type rolling elements is maintained uniformly in the vicinity of both ends of the roller type rolling elements. Thus generation of abnormal noise due to those members is prevented from occurring.

Furthermore, with the above structure, when the spider shaft portion is assembled into the needle bearing, the diminution shape of the roller type rolling elements allows inserting space for each other and functions as a guide. Therefore, the roller type rolling elements, the bearing cup and the spider shaft portion are effectively prevented from getting scratched.

In the cross-shaped joint according to the present invention, it is preferable that a chamfered portion having a tapered feature with a predetermined width be formed at an outer periphery of the end portion of said spider shaft portion. With this feature, the above-mentioned advantageous effects are further enhanced.

With a steering apparatus that uses the cross-shaped joint according to the present embodiment, swift steering can be ensured with an improved steering stability while a steering wheel is handled under high speed driving.

Furthermore, in the cross-shaped joint according to the present invention, it is preferable that a movable amount in the axial direction of said spider shaft portion of each roller type rolling element within said bearing cup be at least 0.6 mm. With this feature, since the space allowing the roller type rolling elements to move is provided, the rollers 12 are not in contact with the inner end surface of the bearing cup 11 and the bending torque is made smaller. Therefore, smooth steering feeling can be obtained.

DETAILED DESCRIPTION OF THE PREFERRED EMBODIMENTS

Figure 1:
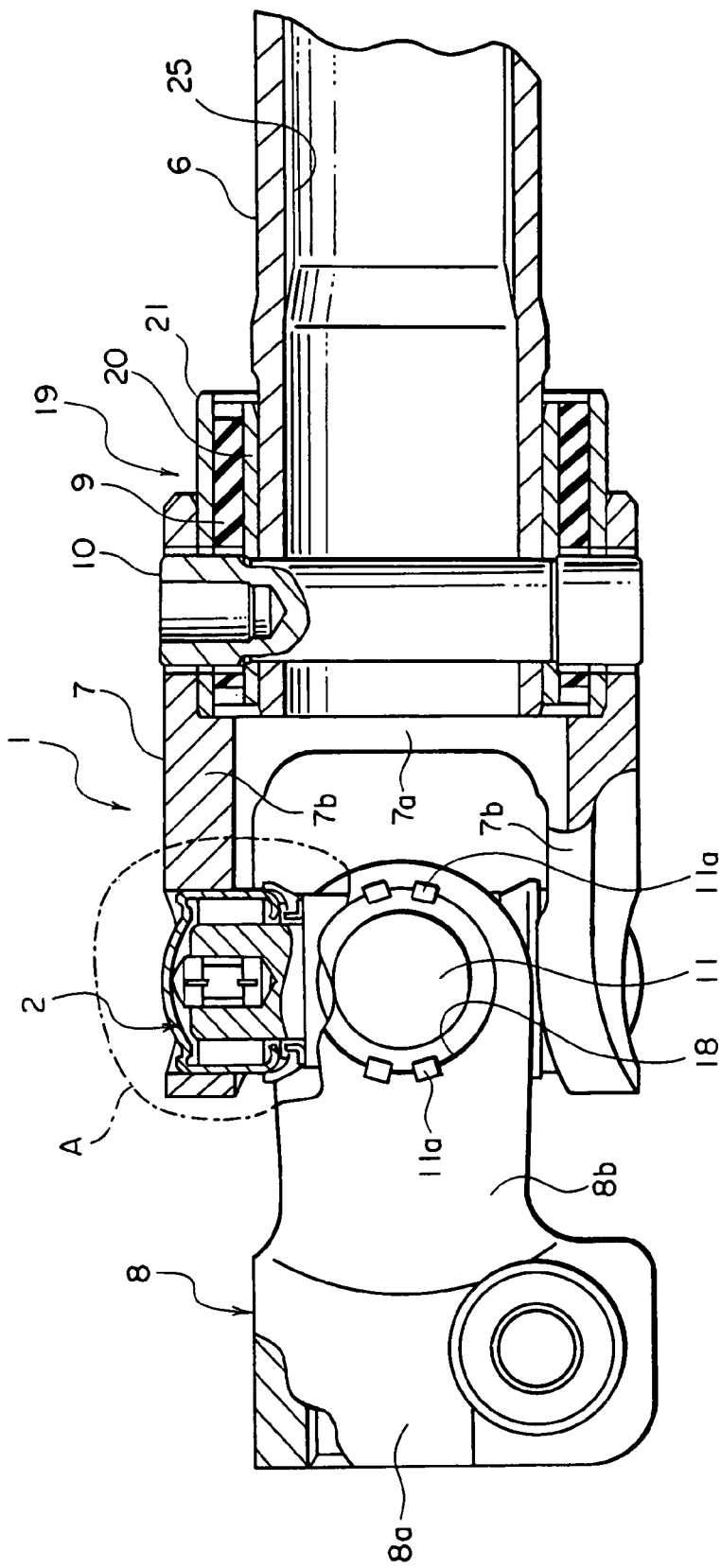
FIG. 1 is a side view including partially cut-away cross sectional view of a cross-shaped joint according to a first embodiment of the present invention.
Figure 2:
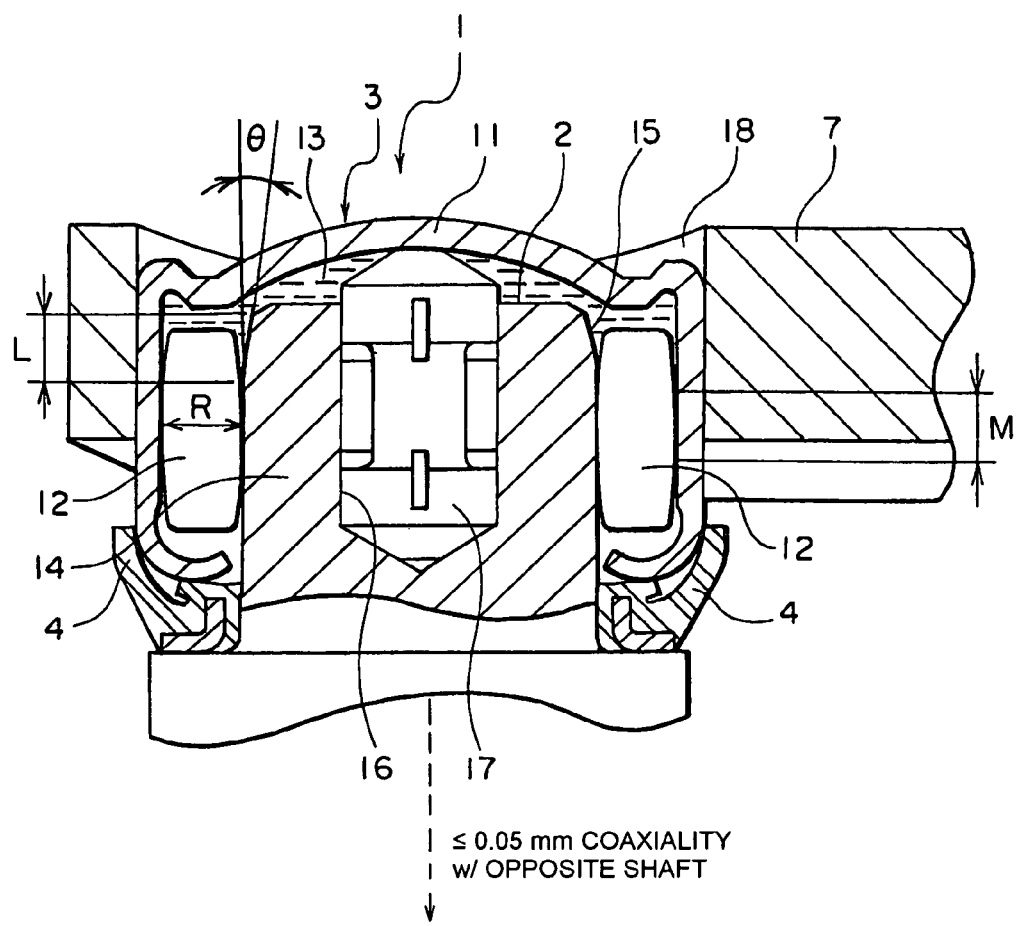
FIG. 2 is an enlarged partial view showing portion A of the cross-shaped joint shown in FIG. 1.
Figure 3:
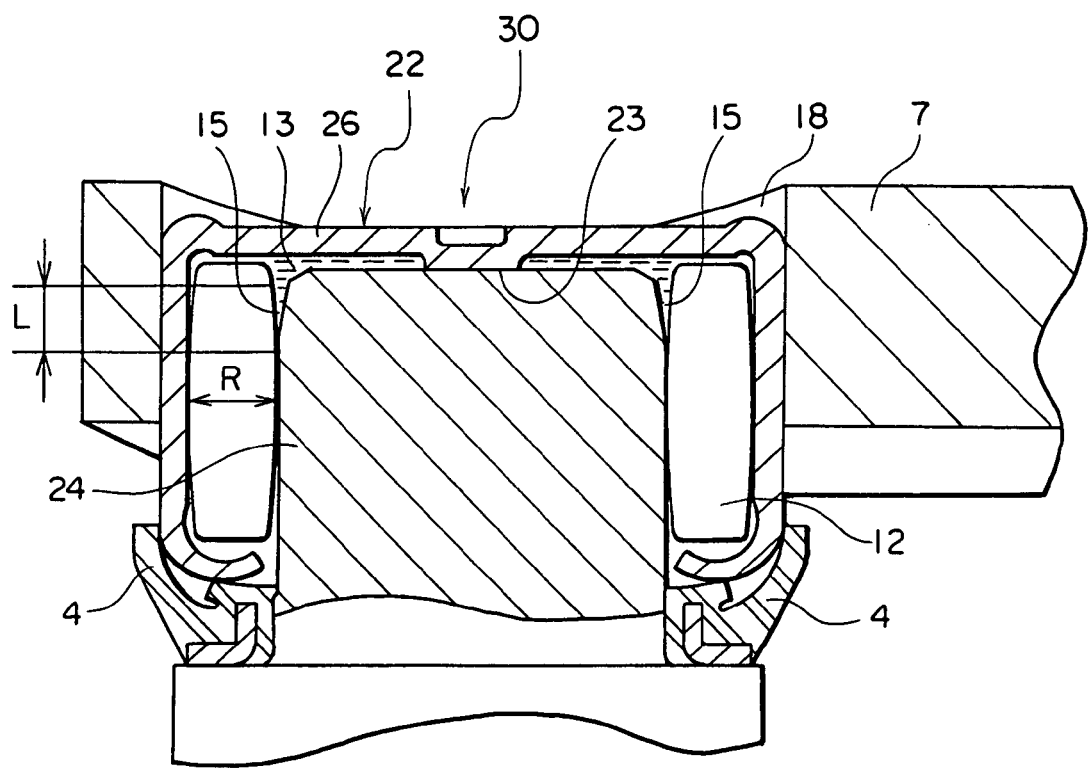
FIG. 3 is a partially cut-away cross sectional view showing a cross-shaped joint according to a second embodiment of the present invention.
Figure 4:
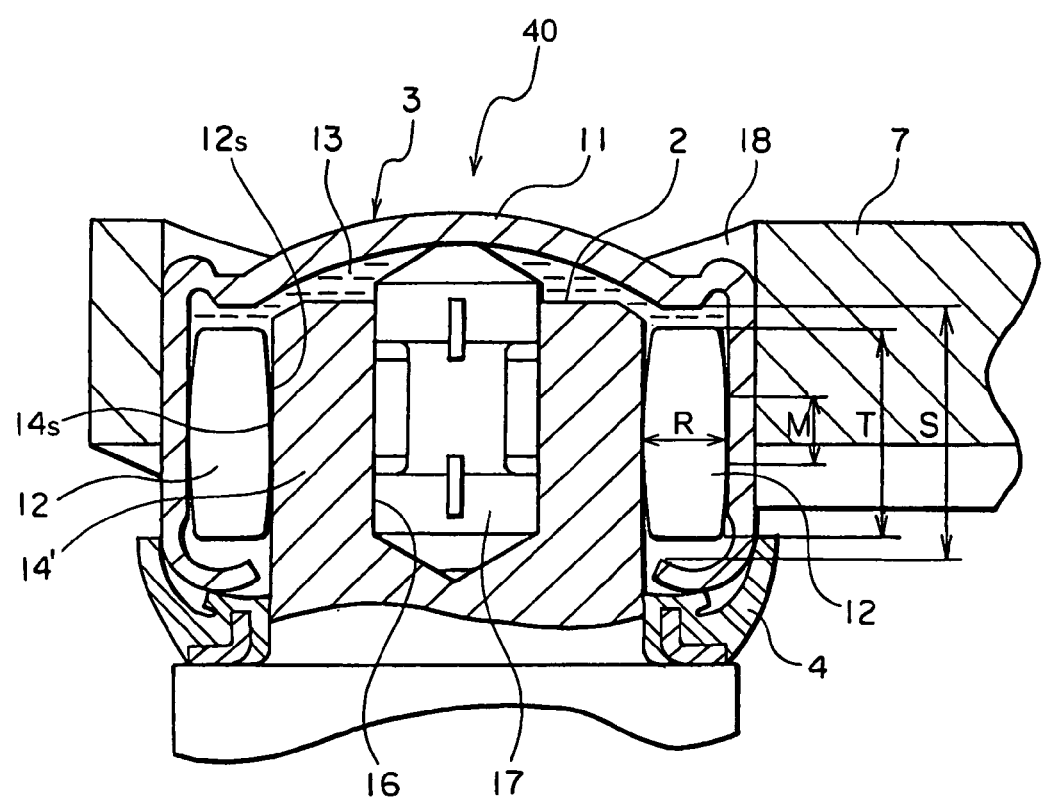
FIG. 4 is a partially cut-away cross sectional view showing a cross-shaped joint according to a third embodiment of the present invention.
Figure 5:
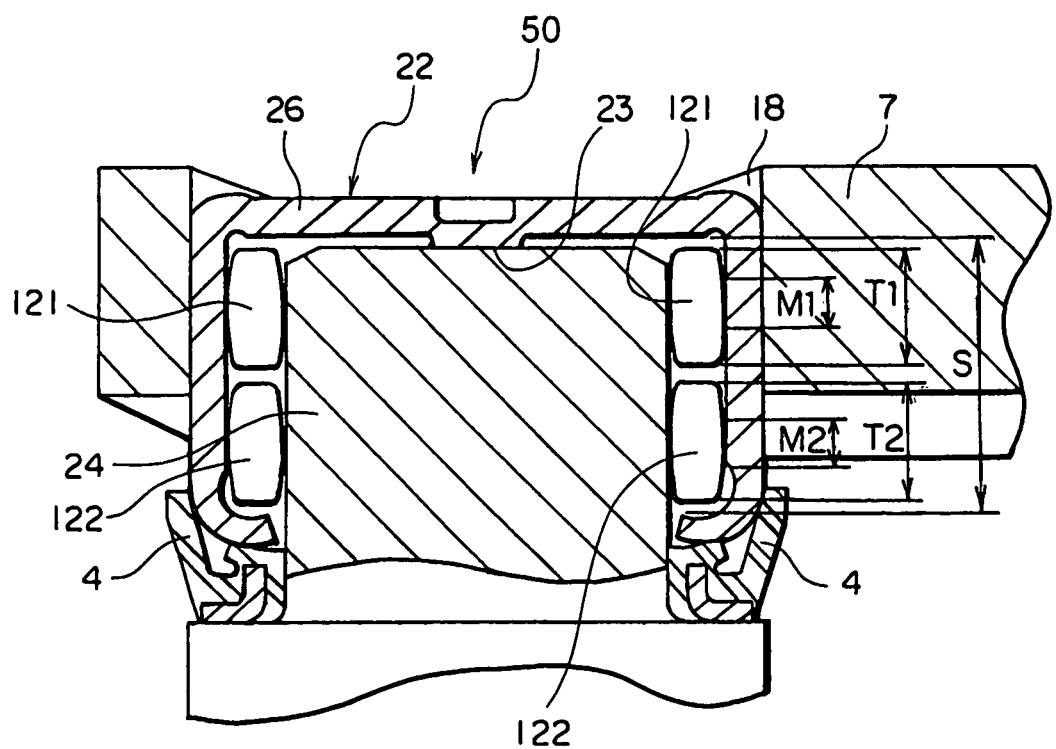
FIG. 5 is a partially cut-away cross sectional view showing a cross-shaped joint according to a fourth embodiment of the present invention.

FIG. 1 is a side view showing a cross-shaped joint according to a first embodiment of the present invention, which is partly cut away to show a cross section. FIG. 2 is a partial enlarged view showing portion A of the cross-shaped joint shown in FIG. 1. FIG. 3 is a partially cut-away cross sectional view showing a cross-shaped joint according to a second embodiment of the present invention. FIG. 4 is a partially cut-away cross sectional view showing a cross-shaped joint according to a third embodiment of the present invention. FIG. 5 is a partially cut-away cross sectional view showing a cross-shaped joint according to a fourth embodiment of the present invention.

First, the first embodiment of the present invention will be described with reference to FIGS. 1 and 2.

As shown in FIGS. 1 and 2, a cross-shaped joint (a joint for steering) 1 has a structure including a cross-shaped spider 2 disposed between a pair of yokes 7 and 8 made of steel plates. The yoke 7 integrally includes a cylindrical base portion 7a and a pair of arms 7b and 7b that are extending in the axial direction from the cylindrical base portion and opposed to each other in a diametrical direction. The cylindrical base portion 7a is joined to a shaft 6 via a cushioning portion 19. The cushioning portion 19 is composed of an outer cylinder 21, an inner cylinder 20 and a rubber bush 9 made of a rubber disposed between the outer and inner cylinders. The inner cylinder 20 is fitted on the outer surface of the shaft 6 and fixed to it. A pin 10 is fixed to the inner cylinder 20. On the inner surface of the shaft 6, there is formed a female spline 25. The yoke 8 integrally includes a base portion 8a with a substantially cylindrical circumferential surface having a pair of securing portions provided in an opposed manner at a part of its circumference and a pair of arms 8b that are extending in the axial direction from the base portion and opposed to each other in a diametrical direction.

At end portions of the arms 7b and 8b of the respective yokes 7 and 8, circular bearing holes 18 are formed in an opposed manner respectively. Shaft portions 14 of the spider 2 provided at end portions of the spider 2 are inserted in the bearing holes 18 of the yokes 7 and 8, so that the spider shaft portions 14 are rotatably supported within the bearing holes 18 of the respective yokes 7 and 8 via needle bearings 3.

Since the structures of all of the circular bearing holes 18 of the yokes 7 and 8 are the same and the structures of the all of the end shaft portions of the spider 2 that are rotatably supported via the bearings 3 are the same, only one of each of them will be specifically described in the following in this specification.

As shown in FIG. 2, the spider shaft portion 14 of the spider 2 is rotatably fitted in the bearing hole 18 of the yoke 7 via the needle bearing 3 including multiple roller type rolling elements 12. A chamfered portion 15 having a tapered feature is formed at the outer periphery of the end portion of the spider shaft portion 14. The axial width of the chamfered portion 15 is L and the tapered surface is designed to form an angle θ of 0.5 to 1.2 degree with respect to the axial direction. The diameter of the spider shaft portion 14 is within the range of 9 to 10 mm, and the circularity and cylindricity are equal to or smaller than 0.005 mm and preferably equal to or smaller than 0.002 mm. The coaxiality of two opposed shaft portions 14 is equal to or smaller than 0.05 mm, as indicated in FIG. 2, and preferably equal to or smaller than 0.02 mm. The width L of the chamfered portion is 0.5 to 3.0 mm, and preferably 1.0 to 2.0 mm. While the cross sectional shape of the chamfered portion 15 is linear, it may be of a curved shape.

Within an axial hole 16 formed on the central axis of the spider shaft portion 14, there is inserted a thrust piece 17. On the outer periphery of the lower portion of the spider shaft portion 14, there is provided a seal member 4.

The thrust piece 17 is a pin made of a synthetic resin such as a polyacetal resin or a polyamide resin or the like. Under the state in which the thrust piece is received within the axial hole 16, the end portion of the thrust piece is projecting beyond the end face of the shaft portion 14 and engaging with the bottom surface of a bearing cup 11. When the bearing cup 11 is press-inserted, an elastic-plastic deformation is created in the thrust piece 17. Therefore, a preload directed toward the center in the axial direction is imparted to the shaft portion of the spider 2, so that the spider disposed between the yoke arms 7b and 7b is maintained at a predetermined position with respect to the axial direction.

The needle bearing 3 is composed of a bearing cup 11, multiple roller type rolling elements 12 and a grease 13 that fills the space between the bearing cup 11 and the spider shaft portion 14. The grease 13 including molybdenum disulfide as an additive will provide a smoother steering feeling. The bearing cup 11 is of a cylindrical form with a bottom and its outer diameter is 15 to 16 mm. The bearing cup 11 is press-inserted into a circular bearing hole 18 formed in the arm of the yoke. The bearing cup 11 is prevented from being detached from the yoke by caulking portions 11a. Between the cylindrical inner circumferential surface of the bearing cup 11 and the outer circumferential surface of the spider shaft portion 14, there are provided a plurality of roller type rolling elements 12. With this structure, the spider shaft portion 14 is rotatably supported within the bearing hole of the corresponding yoke arm via the bearing 3.

The roller type rolling element (which will be referred to as the roller 12 hereinafter) is shaped in such a way that its diameter R gradually decreases by a small amount from the vicinity of the central portion toward both ends portions. The amount of decrease in the diameter R is 0.004 to 0.022 mm at the position 0.8 mm away from the end face of the roller 12 toward the central portion. The roller 12 is designed to be interference fitted with the spider shaft portion 14 and the needle bearing 3 in the vicinity of its central portion, that is, in the area M that makes up 13 to 70% of the total length of the roller 12. Therefore, it is possible to reduce the load required at the time of assembling the spider shaft portion 14 into the needle bearing 3, and therefore the assembling can be made easy. The number of the rollers 12 are 16 to 25. The material of the rollers is SUJ1 to SUJ 5 of Japanese Industrial Standards (JIS).

In the above-described structure, the chamfered portion 15 of the spider shaft portion 14 may be processed by cutting. In addition, the chamfered portion 15 may also be processed simultaneously with the grinding of the spider shaft portion 14. In the latter case, a high precision part can be made at low cost.

When the spider shaft portion 14 is to be assembled to the needle bearing 3, the diminution shape of the rollers 12 and the chamfered portion 15 allow inserting space for each other and guide each other. Therefore, the rollers 12, the bearing cup 11 and the spider shaft portion 14 are unlikely to be get scratched, and even if scratched, the scratch can be limited to a small one.

Since the spider shaft portion 14 is interference fitted with the needle bearing 3 in the central area M of the rollers 12, even if a vibration is transmitted to it from the wheels, small clearances formed between the spider shaft portion 14 and the rollers 12 and between the inner surface of the bearing cup 11 and the rollers 12 in the vicinity of both ends of the rollers are maintained uniformly. Therefore, generation of abnormal noise due to interference of those members can be prevented.

With a steering apparatus that uses the cross-shaped joint according to the present embodiment, swift steering can be ensured with an improved steering stability while a steering wheel is handled under high speed driving.

In addition, since the area M is smaller than that of conventional rollers, the rolling resistance is not increased so much in spite of the interference fit. Therefore, the bending torque is small, and smooth steering feeling can be realized.

While the cushioning portion 19 is provided in the present embodiment, a rubber coupling may be assembled instead. In addition, in a steering apparatus in which the present embodiment is applied, there may be provided, at any portion of the apparatus, a rubber coupling, a cushioning portion the same as the present embodiment, a cushioning portion of other forms, a slide mechanism represented by a spline fit, or a displacement absorbing mechanism prepared for collision.

In the case that a cross-shaped joint having no play like this embodiment and a slide mechanism of the above-mentioned type having no play are used in combination, generation of abnormal noise can be effectively prevented in the steering apparatus as a whole. One cross-shaped joint has four needle bearings 3 and spider shaft portions 14, and the structure described in connection with the cross-shaped joint according to the present invention is to be applied to at least one of them.

A steering apparatus to which the cross-shaped joint according to the present invention is to be used may be a hydraulic power steering system, an electric power steering system or any other steering system.

Next, a second embodiment 30 of the present invention will be described with reference to FIG. 3.

The second embodiment is substantially the same as the above-described first embodiment, and the same parts are designated by the same reference numerals and descriptions thereof will be omitted. What is different in the second embodiment from the first embodiment is that the present invention is applied to a shell type cross-shaped joint in which an end surface of the spider shaft portion 24 is in contact with an inward projection 23 formed on the central portion of the inner bottom surface of the bearing cup 26 of the needle bearing 22.

In this embodiment also, each roller 12 is shaped in such a way that its diameter R gradually decreases from the vicinity of the central portion toward both ends portions, and a chamfered portion 15 having a tapered feature is formed with a width L at the outer periphery of the end portion of the spider shaft portion 14. The second embodiment is expected to carry out the effects same as those of the first embodiment.

While the second embodiment is directed to a cross-shaped joint with a shell type needle roller bearing, it may be applied to a cross-shaped joint with a solid type needle roller bearing.

Next, a third embodiment 40 of the present invention will be described with reference to FIG. 4.

The third embodiment is substantially the same as the above-described first embodiment, and the same parts are designated by the same reference numerals and descriptions thereof will be omitted. Each roller 12 is shaped in such a way that its diameter R gradually decreases from the vicinity of the central portion toward both ends portions in a similar manner as in the above-described embodiments. What is different in this embodiment from the above-described embodiments is that the chamfered portion 15 of the spider shaft portion 14'is not provided and each roller 12 is movable within the bearing cup 11 in the axial direction of the spider shaft portion 14' by a total movable amount of 0.6 mm. This total movable amount is designed to be at least 0.6 mm, namely, it is preferable that that amount be equal to or more than 0.6 mm. In other words, letting T be the length of the roller 12 and S be the width of the interior space of the bearing cup in the axial direction of the spider shaft portion 14', $(S-T) \geq 0.6$ mm is satisfied.

Therefore, if the roller 12 is positioned at the center with respect to the axial direction of the spider shaft portion 14' in the interior space of the bearing cup 11, the roller 12 is movable in the axial direction of the spider shaft portion 14' by 0.3 mm.

Symbol M represents the area throughout which the spider shaft portion 14' is in interference fit with the needle bearing 3 in the central portion of the rollers 12. The surface roughness of the rolling surface 12s of the roller is about Rz=0.4 μm and that of the surface 14s of the spider shaft portion 14' is about Rz=1 μm in terms of the ten point average roughness defined in Japan Industrial Standards (JIS).

This structure requires an assembling time longer than that of the foregoing embodiments and its cost may increase in some cases. However, smooth steering feeling can be obtained by this structure, since the rollers 12 are not in contact with the inner end surfaces of the bearing cup 11 and the bending torque is made smaller.

A fourth embodiment 50 of the present invention will be described with reference to FIG. 5. The fourth embodiment is substantially the same as the above-described second embodiment, and the same parts are designated by the same reference numerals and descriptions thereof will be omitted. What is different in the fourth embodiment from the second embodiment is that the chamfered portion 15 of the spider shaft portion 24 is not provided and multiple rows of rollers 12 (in this embodiment, two rows) are provided, namely, the row of the rollers 121 and the row of the rollers 122. As is the case with the above-described embodiment, each roller 121 or 122 is shaped in such a way that its diameter R gradually decreases from the vicinity of the central portion toward both ends portions. Letting T1 and T2 be the lengths of the respective rollers 121 and 122, S−(T1+T2)≧0.6 mm is satisfied, similarly to the above-described third embodiment.

Symbols M1 and M2 represent the areas throughout which the spider shaft portion 14 is in interference fit with the needle bearing 3 in the central portions of the rollers 121 and 122. The lengths T1 and T2 of the roller 121 and roller 122 may be different, but the cost would be reduced if they are the same length.

This structure is also expected to carry out the effects same as those of the third embodiment. However, its cost will increase, since the number of the rollers is increased and the time required for assembling the roller to the bearing cup is increased.

While the diameter of the roller 121 and the diameter of the roller 122 are designed to be substantially the same in this embodiment, it would be effective to make the diameter of the roller 122 (which is disposed on the open side of the cup 25) larger than the diameter of the roller 121. Preferably, the diameter difference of the roller 121 and the roller 122 is designed to be 0.002 to 0.010 mm. In this case, the durability and the service life can be improved by virtue of reduction of the contact surface pressure between the spider shaft portion 24, the rollers 121 and the bearing cup 22 under presence of a torsion torque, though the cost increases.

The structure may be modified in such a way that the rollers 121 or 122 in one of the rows are clearance-fitted and the rollers 121 or 122 in the other row are interference fitted.

While in the above-described four embodiments, the yokes 7 and 8 are formed by plate working, the yokes may be formed by forging or casting, and the material of the yokes may be either an iron base material or an aluminum base material.

Figure 6:
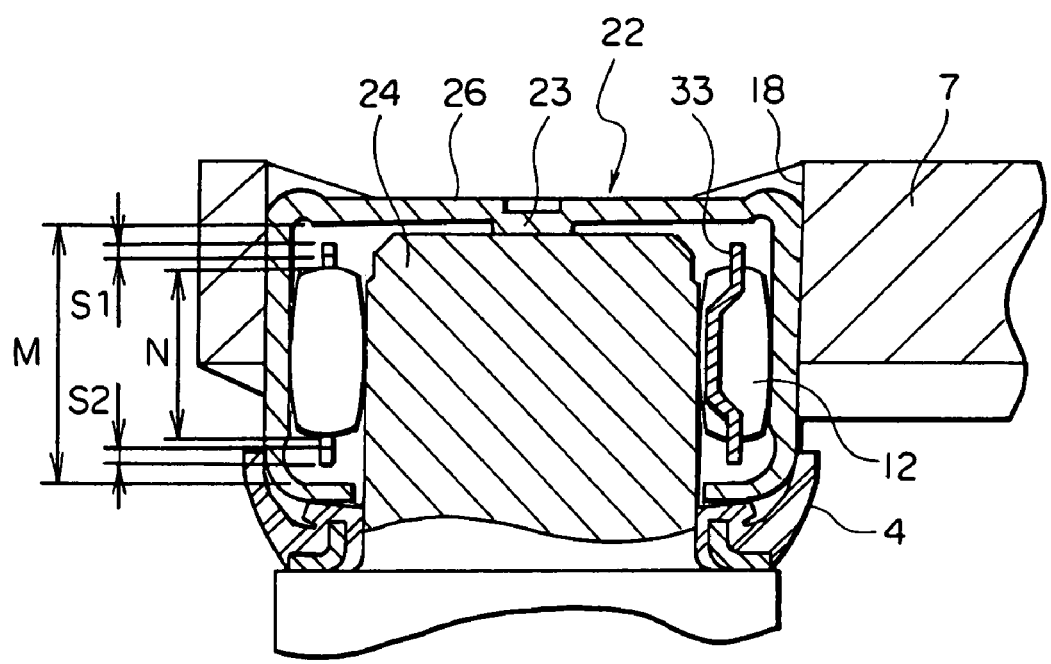
FIG. 6 is a partially cut-away cross sectional view showing a cross-shaped joint according to a fifth embodiment of the present invention.

FIG. 6 is a partial cross sectional view showing a cross-shaped joint according to a fifth embodiment of the present invention.

The fifth embodiment of the present invention will be described with reference to FIG. 6. The fifth embodiment is substantially the same as the above-described second embodiment, and the same parts are designated by the same reference numerals and descriptions thereof will be omitted. In this embodiment also, each roller 12 is shaped in such a way that its diameter R gradually decreases from the vicinity of the central portion toward both ends portions in a similar manner as in the above-described embodiments. In this embodiment, a cage 33 is provided in the needle bearing 22. In this structure, letting M be the distance between the inner surfaces of both end portions of the cup, S1 and S2 be the axial widths of the frame portion of the cage 33 that supports the central portions of the rollers 12, and N be the length of each roller 12, condition M−N−S1−S2≧0.6 mm is satisfied.

Figure 7:
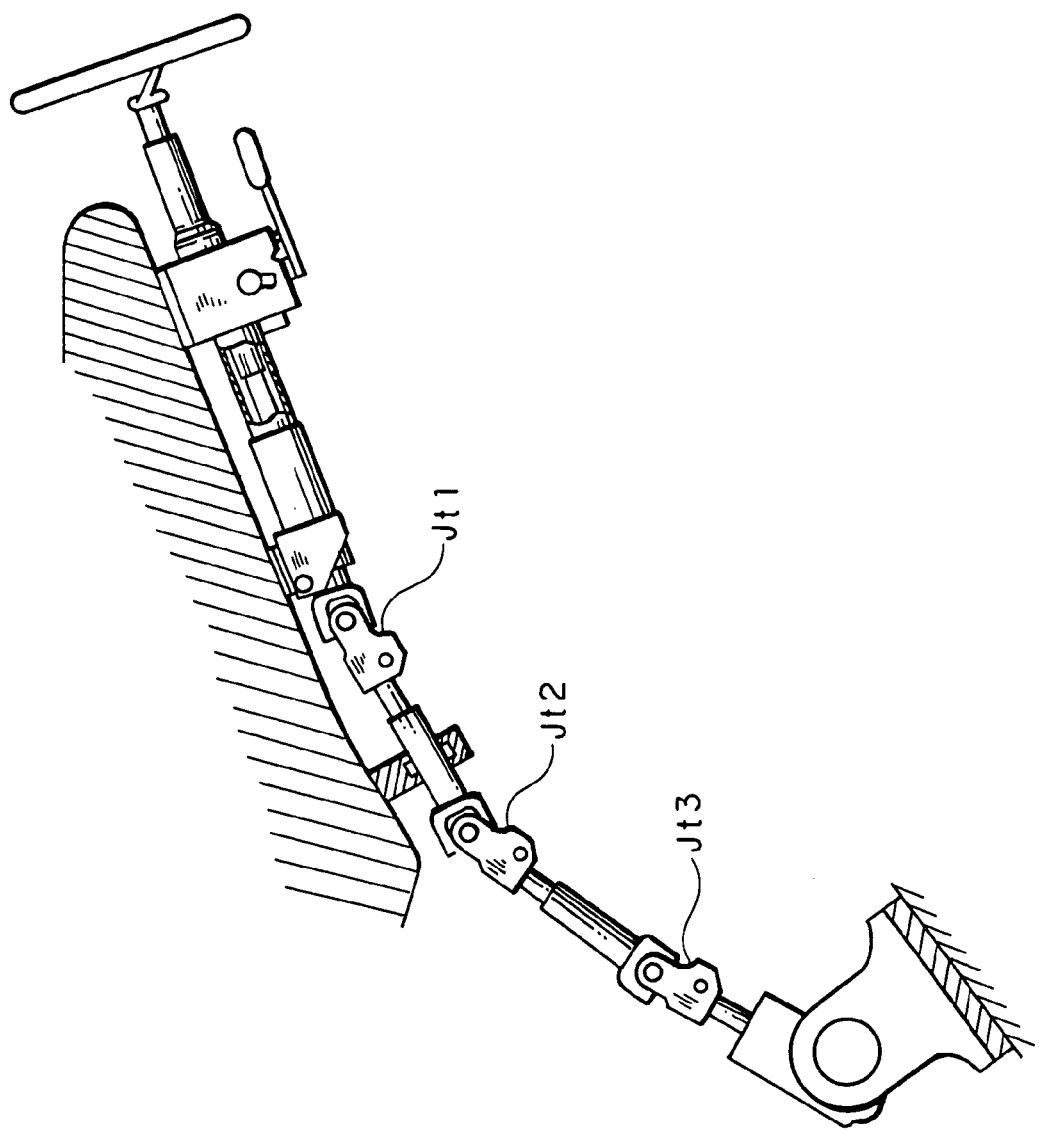
FIG. 7 is a drawing schematically showing a steering apparatus having three joints that adopts at least one cross-shaped joint according to any embodiment of the present invention mentioned above.

This embodiment is costly as compared to the other embodiments due to the provision of the cage 33. However, since the rollers 12 incline independently from each other, they rarely incline in one and the same direction contrary to a full roller type design. Therefore, a force that biases the spider shaft portion 24 in the axial direction is small, so that the abrasion resistance of the contact portion between the central projection 23 on the bottom surface of the cup 26 and the end face of the spider shaft portion 24 will be enhanced. In addition, in a steering apparatus having three joints Jt1, Jt2 and Jt3 as shown in FIG. 7 or in a apparatus having two joints, the cross-shaped joint according to this embodiment is used as at least one of the joints.

As has been described in the foregoing, in a cross-shaped joint according to the present invention, a needle bearing and a spider shaft portion are in interference fit via roller type rolling elements, and the spider shaft portion is interference fitted only in the central portion of the roller type rolling elements (or the needle bearing). Therefore, even if a vibration is transmitted from the wheels, each of the clearances between the spider shaft portion and the roller type rolling elements and between the inner surface of the cup and the roller type rolling elements is maintained uniformly in the vicinity of both ends of the roller type rolling elements. Thus generation of abnormal noise due to those members is prevented from occurring.

According to the invention, since the roller type rolling element is shaped in such a way that its diameter gradually decreases from the vicinity of the central portion toward both ends portions, the diminution shape of the roller type rolling elements, roller type rolling elements, the cup and the spider shaft portion are unlikely to be get scratched upon assembling of the spider shaft portion into the needle bearing, and even if scratched, the scratch can be limited to a small one. In addition, the insertion load can be made small. Therefore, smooth steering feeling can be obtained and the assembling operation can be performed easily and in a short time without an increase in manufacturing cost.

What is claimed is:

1. A cross-shaped joint for a steering apparatus, and in which a spider engages with a yoke in such a way that a spider shaft portion is rotatably fitted to a bearing hole of the yoke via a needle bearing including a bearing cup and a plurality of rollers disposed within the cup:

wherein said needle bearing and said spider shaft portion are interference fitted via said rollers; and said rollers are shaped in such a way that a diameter of each roller gradually decreases from a vicinity of its central portion toward both end portions, such that the interference fit is only through the central portions of the rollers and radial clearances are provided adjacent to the end portions of the rollers.

2. A cross-shaped joint according to claim 1, wherein a chamfered portion having a tapered feature with a predetermined width is formed at an outer periphery of an end portion of said spider shaft portion.

3. A cross-shaped joint according to claim 2, wherein a taper surface of said chamfered portion forms an angle of 0.5 to 1.2 degree with respect to the axial direction of said spider shaft portion.

4. A cross-shaped joint according to claim 1, wherein a total movable amount in the axial direction of said spider shaft portion of the roller type rolling elements within said bearing cup is at least 0.6 mm.

5. A cross-shaped joint according to claim 1, wherein multiple rows of the rollers are provided in said bearing cup.

6. A cross-shaped joint according to claim 1, wherein coaxiality of two opposite shaft portions of the spider is equal to or smaller than 0.05 mm.

7. A steering apparatus comprising, in combination, a cross-shaped joint according to claim 1, and a slide mechanism having no play.

8. A bearing for a cross-shaped joint of a steering apparatus and for rotatably supporting an end shaft portion of a spider in a circular hole formed at an end portion of one of a pair of yokes that are connected via said spider, comprising:

a cup fitted in the circular hole formed at the end portion of said one yoke; and a plurality of rolling elements provided between an inner surface of said cup and said end shaft portion of the spider;

wherein said end shaft portion of the spider is interference fitted via said rolling elements with the bearing, and wherein said rolling elements comprise rollers each of which is shaped in such a way that its diameter gradually decreases from a central portion toward both end portions in its longitudinal direction, such that the interference fit is only through the central portions of the rollers and radial clearances are provided adjacent to the end portions of the rollers.

9. A cross-shaped joint for a steering apparatus and comprising:

a pair of yokes each of which is integrally provided with forked arms on which opposed circular holes are formed;

a spider having end shaft portions; and bearings that rotatably support said end shaft portions of the spider respectively in the circular holes of said yokes, each of said bearings including a cup fitted in the circular hole of the yoke and a plurality of rolling elements provided between an inner circumferential surface of said cup and said end shaft portion of the spider;

wherein said end shaft portions of the spider are interference fitted in said bearings via said rolling elements, and wherein said rolling elements comprise rollers each of which is shaped in such a way that a diameter of each roller gradually decreases from a central portion toward both end portions in its longitudinal direction, such that the interference fit is only through the central portions of the rollers and radial clearances are provided adjacent to the end portions of the rollers.

10. A cross-shaped joint according to claim 9, wherein coaxiality of two opposite shaft portions of the spider is equal to or smaller than 0.05 mm.

11. A steering apparatus comprising, in combination, a cross-shaped joint according to claim 9, and a slide mechanism having no play.

* * * * *